March 21, 1939.  D. ANGLADA  2,151,179
ILLUMINATING AND SAFETY LAMP
Filed May 28, 1937  2 Sheets-Sheet 1
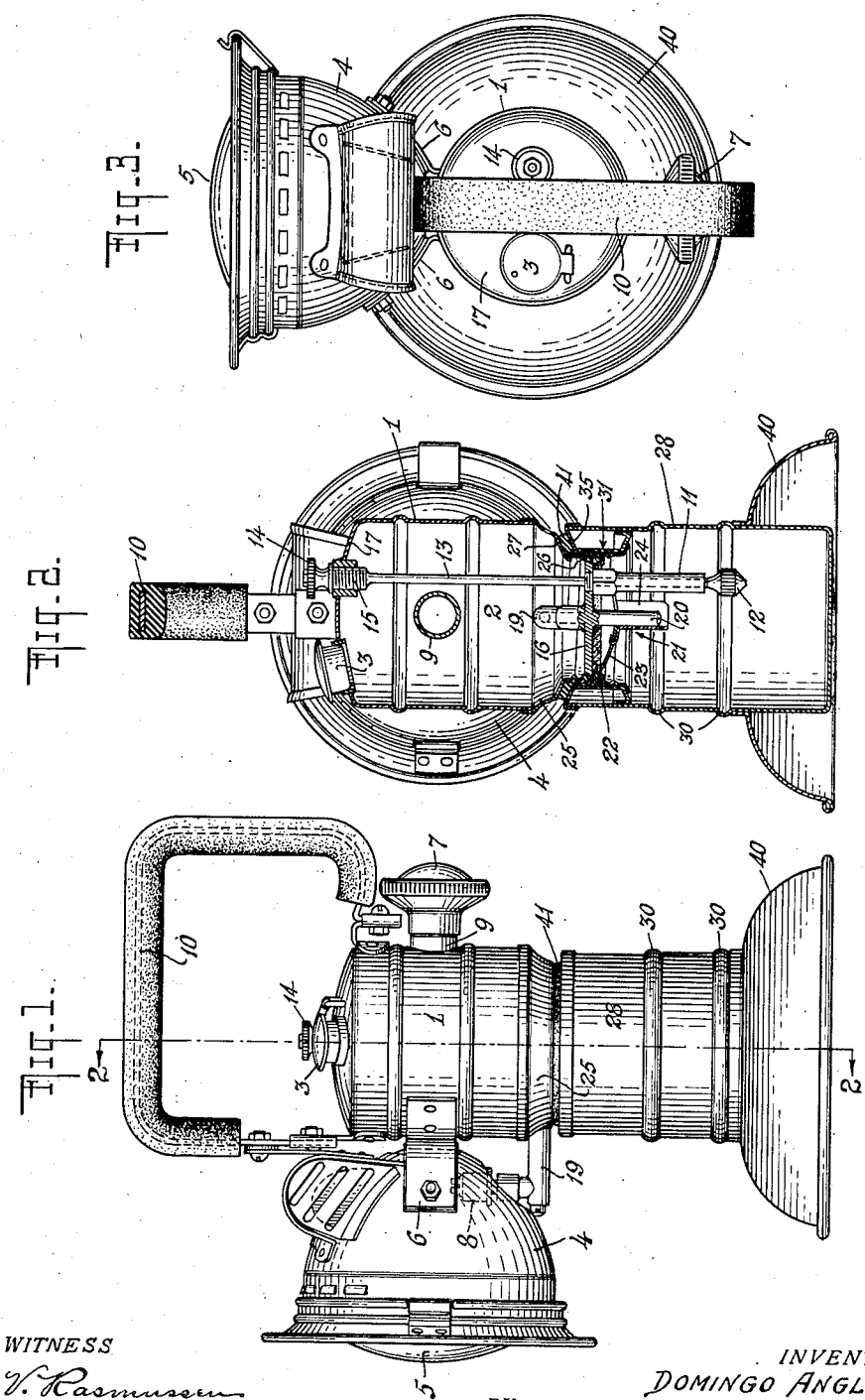
WITNESS
G. V. Rasmussen
INVENTOR
DOMINGO ANGLADA
BY
ATTORNEYS

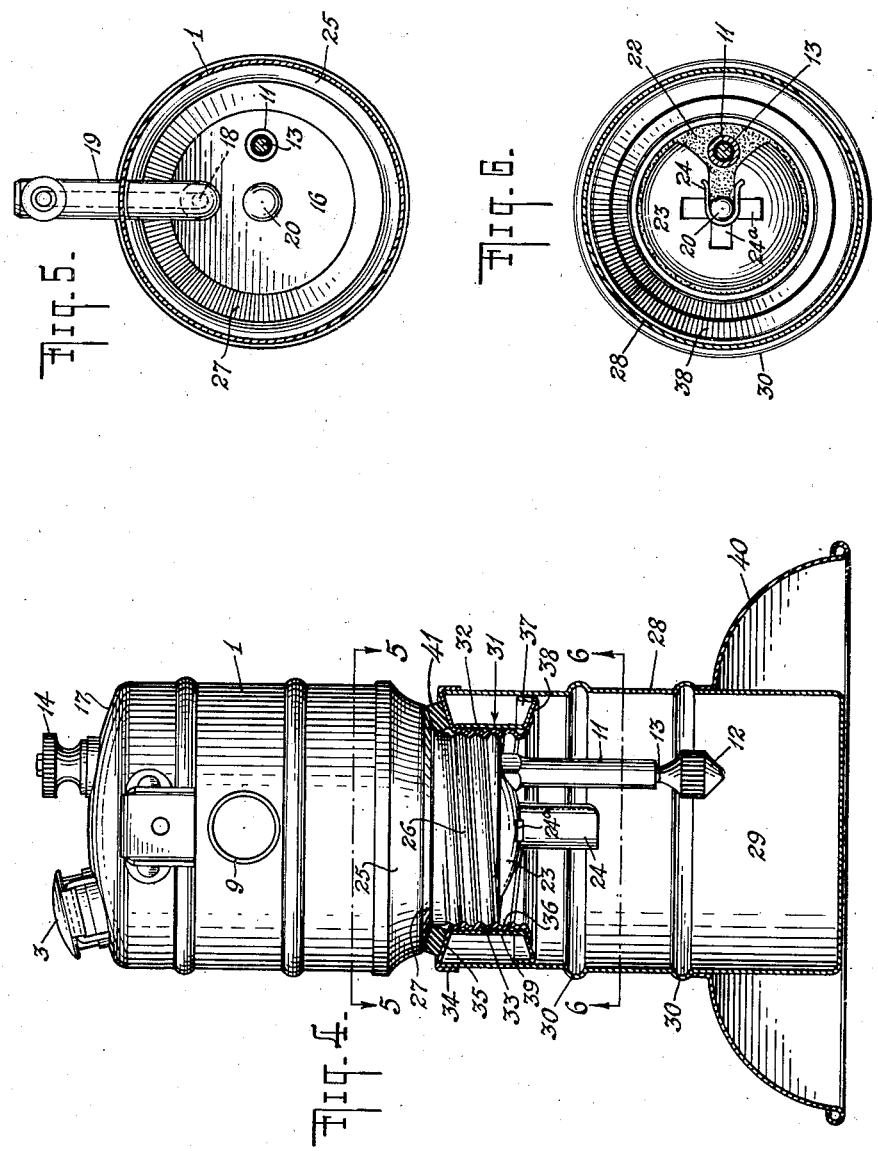

Patented Mar. 21, 1939

2,151,179

UNITED STATES PATENT OFFICE 2,151,179

ILLUMINATING AND SAFETY LAMP

Domingo Anglada, Bronx, N. Y., assignor to Wolf Safety Lamp Co. of America, Inc., Brooklyn, N. Y., a corporation of New York Application May 28, 1937, Serial No. 145,183

1 Claim. (Cl. 48—4)

This invention relates to illuminating and safety lamps of the type which utilize calcium carbide as a fuel from which a gas is generated by the introduction of water to the carbide.

Carbide lamps have been in the market for some years, types of such lamps being illustrated in my United States Patents Nos. 1,617,432 and 1,820,642, which types of lamps have been extensively manufactured and sold, particularly to railroads and subway systems, and used in connection with the inspection and repair of tracks and the control of trains. It is to be noted that such carbide lamps are usually made in two parts: The lower portion which embodies the carbide chamber and the upper portion which embodies the water chamber, the parts necessary in order to bring about the proper relation and the cooperation of the water and the carbide and the burning of the gas being in part carried by the upper portion and in part by the lower portion. It has been the practice in the manufacture of such lamps to locate some of the attaching and operating parts to the upper portion of the lamp and some to the lower portion, but this practice has been the source of considerable injury to the lamps and of failure of the lamp to function properly. The gas generated in the lamp of course sets up pressure and any injury to the lamp parts causes leakage of the gas and the consequent failure of the lamp to function. The lamps are subjected to hard usage, not only in the ordinary handling thereof in and about railroads and subway systems, but also when the carbide becomes exhausted and it is necessary to clean out the carbide chamber and replace the same with a new charge.

The object of the present invention is to associate all of the delicate attaching and operating parts to the upper portion of the lamp and to provide the lower portion or carbide carrying member of a sturdy construction, free of the delicate attaching and operating parts. It has been found that railroad workmen who utilize the carbide lamps will handle the upper portion of the lamp which carries the lens, with care, particularly when the upper and lower portions of the lamp are dissociated, but the lower portion of the lamp is subjected to considerable rough handling during the use of the lamp and in removing the spent carbide and replenishing with a new charge. The present invention was devised in order to take advantage of the tendency of the workmen to handle, protect and guard the upper portion of the lamp from rough usage and I have transferred to that portion of the lamp all the delicate operating parts and have made the bottom portion of the lamp strong and sturdy, and eliminated therefrom the delicate attaching and operating parts, and have provided a structure free of crevices or pockets in which the spent carbide can stick and therefore not readily accessible to removal. The construction of the bottom portion of the lamp of this invention, when the old charge is to be removed from the lamp, will not be damaged should it be tapped or struck against a hard surface in order to dislodge the spent and caked carbide, nor are there any exposed parts which can be injured.

In the accompanying drawings, Fig. 1 is a side elevation of the complete lamp; Fig. 2 is a vertical section on the line 2—2 of Fig. 1; Fig. 3 is a plan view of the lamp; Fig. 4 is a view of the rear of the lamp with the handle removed and a portion of the rear wall of the carbide chamber removed; Fig. 5 is a section on the line 5—5 of Fig. 4, and Fig. 6 is a section on the line 6—6 of Fig. 4.

The upper portion or casing 1 of the lamp, as will be observable from an inspection of Fig. 2, is hollow to provide a water chamber 2, to which access is obtained for filling by lifting the cap 3. The lens housing 4 carrying the lens 5 is attached to the top casing 1 by the brackets 6. The rear lens 7 is in alignment with the burner 8 and light from said burner is transmitted to the rear lens through the tube 9 aligned with the burner. The handle 10 is attached to the top of the casing 1. The water duct 11 communicates with the water chamber 2 and is provided with a valve member 12 which is operable through the stem 13, finger piece 14 and the screw thread 15 in order to increase or decrease the admission of water to the carbide chamber as the finger piece is operated, which parts are all carried by the bottom plate 16 which is part of the shell of the casing 1 and the arch top 17 of the casing. The bottom plate 16 is provided with an aperture 18 for the escape of the acetylene gas from the carbide chamber through the burner tube 19 to the burner 8. The plate 16 is also provided with a stud 20 suitably formed thereon and adapted to support a device 21 for pressing against and retaining the filtering material 22 which overlies the aperture 18, requiring the acetylene gas to pass through the filtering material before it reaches the burner. The device 21 is in effect a clamp consisting of a circular plate 23 and a U-shaped clamping member 24 attached by the fingers 24a to the plate 23. The U-shaped clamp frictionally engages the stud 20 and can be pressed downward with a sliding motion, thereby permitting the plate to be pressed firmly against the filtering material, the whole being retained in place by the frictional engagement of the U-clamp 24 and the stud 20.

The lower portion 25 of the top casing 1 is made of a separate piece of sheet material formed with the screw threads 26 which extend beyond the end of the section 25 and its bottom plate 16. The burner tube 19 and the stud 20 are secured to the portion 25 by solder, such portion being readily accessible for the attachment of these parts before it is united to the main portion of the casing 1. The screw threads 26 at the base thereof are surrounded by an annular circular wall 27 which is slightly inclined in a direction upwardly and outwardly with respect to the screw threads. The lower portion 28 of the lamp is substantially barrel-shaped, the internal portion 29 thereof constituting the carbide chamber. The main portion of the barrel-shaped member 28 is preferably made of a single piece of brass or other sheet material drawn to the configuration shown and provided with circumferential beads 30 for the purpose of strengthening the same. The mouth of the member 28 is equipped with a member 31 made of two associated ring-like members 32 and 33. The inner ring-like member 33 is provided with a flange 34 adapted to fit on the outside of the edge of the mouth of the barrel-shaped member 28 having an annular wall 35 which slopes inwardly and downwardly substantially paralleling the plane of the wall 27 formed in the upper member. Screw threads 36 are formed in the depending portion of the ring-like member 33 for co-action with the threads 26. The outer ring member 32 is provided with an annular flange 37 which is of such a size as to permit insertion thereof through the mouth of the member 28 and to snugly fit the inner wall thereof. The said member 32 is formed with the walls 38 and 39 for attachment by soldering or welding to the member 33. It will be noted that the member 31 is a unitary structure and can be inserted into the open mouth of the barrel-shaped bottom 28 and soldered or welded in place. The bottom of the member 28 has attached thereto a bell-like support 40 by soldering or otherwise to provide a stand upon which the lamp may set, the lower portion of the member 28 extending through this bell, as shown in Fig. 4.

The upper portion 1 of the lamp carrying all the delicate operating parts is attachable to the barrel member 28 by interengagement of the screw portions 26 and 36 with an annular rubber washer 41 interposed between the walls 27 and 35. The washer 41, though normally flat, will, when squeezing pressure is applied thereto by screwing together the two parts, conform in shape to the said walls 27 and 35 and make a tight joint between the upper and lower portions.

I claim:

In a carbide lamp, a water chamber arranged in the top of said lamp, and a barrel-like carbide chamber adapted to be removably secured to the water chamber, the carbide chamber having an open top, an attaching member secured to the carbide chamber at the open end thereof, said attaching member having a wall spaced from the body of said carbide chamber and substantially concentric therewith, said wall being provided with screw threads, said attaching member having an outwardly and upwardly inclined circumferential surface extending from the uppermost course of said screw threads and over the top edge of the carbide chamber body, the said screw threads and the innermost edge of said inclined wall being below the outermost circumferential edge of said inclined surface, the water chamber being provided with an extension, screw threads on said extension, an inclined wall near the position of said screw threads, the last mentioned inclined wall corresponding, in its inclination, to the inclination of the wall of said carbide chamber, a resilient sealing member arranged between said inclined walls and being adapted to be uniformly compressed between said walls when the water chamber and the carbide chamber are secured together by the interengagement of said screw threads, said sealing member, when compressed, conforming at its top and bottom surfaces to the inclined surfaces, thereby sealing the union of the water chamber and the carbide chamber against the escape of gas developed in said carbide chamber, the screw threads on said carbide chamber, being below the outer edge of its inclined wall, providing a surface against which the carbide chamber may be knocked to dislodge spent carbide, said edge protecting the screw threads on said carbide chamber against distortion during such dislodgment of said spent carbide.

DOMINGO ANGLADA.